(12) United States Patent
Dünwald et al.

(10) Patent No.: US 6,237,742 B1
(45) Date of Patent: May 29, 2001

(54) APPARATUS FOR PARALLEL ALIGNING ELONGATED WORKPIECES

(75) Inventors: Karl-Heinz Dünwald, Köln; Rainer Schmidt, Altena, both of (DE)

(73) Assignee: RSA Entgrat-U. Trenn-System GmbH & Co., Ludenscheid (DE)

( * ) Notice: Subject to any disclaimer, the term of this patent is extended or adjusted under 35 U.S.C. 154(b) by 0 days.

(21) Appl. No.: 09/515,639

(22) Filed: Feb. 29, 2000

(30) Foreign Application Priority Data

Mar. 12, 1999 (DE) .............................. 199 10 936

(51) Int. Cl.⁷ .................................. B65G 47/24
(52) U.S. Cl. .................. 198/416; 198/443; 414/745.1
(58) Field of Search ........................ 198/443, 446, 198/416, 836.2, 457.07, 547, 598; 414/745.1, 745.8, 746.8

(56) References Cited

U.S. PATENT DOCUMENTS

| | | | | |
|---|---|---|---|---|
| 4,526,269 | * | 7/1985 | Henderson et al. | 198/443 |
| 4,573,860 | * | 3/1986 | Peddingraus | 198/443 X |
| 4,997,079 | | 3/1991 | Suopjarvi | 198/443 |
| 5,363,950 | * | 11/1994 | Laluna et al. | 198/443 X |
| 5,842,559 | * | 12/1998 | Madsen et al. | 198/416 X |

FOREIGN PATENT DOCUMENTS

| | | |
|---|---|---|
| 2937496 | 3/1980 | (DE) . |
| 295 00 384 U | 3/1995 | (DE) . |

* cited by examiner

Primary Examiner—James R. Bidwell
(74) Attorney, Agent, or Firm—Herbert Dubno; Andrew Wilford

(57) ABSTRACT

A conveyor defining a horizontal transport surface receives elongated workpieces in crossed-over and nonparallel orientation at an input side of the surface and moves them in a horizontal transport direction to an output side of the surface. A workpiece-aligning apparatus has a guide extending generally parallel to the workpieces along the surface, a carriage displaceable along the guide parallel to the workpieces, and a pushdown element vertically displaceable on the carriage between a lower position engaging and pushing down the workpieces and an upper position above the workpieces. A drive displaces the carriage along the guide with the element in the lower position and thereby presses the workpieces down against the transport surface and moves the workpieces into generally parallel alignment with one another.

13 Claims, 3 Drawing Sheets

APPARATUS FOR PARALLEL ALIGNING ELONGATED WORKPIECES

FIELD OF THE INVENTION

The present invention relates to an apparatus for and method of aligning elongated workpieces parallel to one another. More particularly this invention concerns such an apparatus capable of reducing a plurality of criss-crossed and overlapping elongated workpieces into a neat parallel array.

BACKGROUND OF THE INVENTION

In various manufacturing operations a plurality of elongated workpieces which may be solid or hollow are delivered to an input station in basically jumbled condition, with some of the workpieces overlying, and some underlying others. In order to act on the workpieces individually, for instance to saw them to length, they have to be sorted into an array extending generally parallel to one another with no workpiece lying underneath or atop another. This is a particular problem in a milling operations where the generally straight roundwood is dropped from a truck onto a chain conveyor, or in an industrial system cutting into sections long lengths of tubing or hose delivered in bundles which might actually be twisted.

In a trample-beam system there are a plurality of separately driven beams extending transverse to the workpieces and that basically repeatedly push down on them until the workpieces are only one layer thick. The movements of the various beams are synchronized, with the downward movement starting at one end and traveling longitudinally along the workpieces to hanmmer them into place. Obviously such a piece of equipment is very large and complex. Furthermore the vertical stroke of the trample beams must be carefully adjusted for maximum workpiece diameter. See German utility model 295 00 945.

Another system has a brush arrangement that rotates to brush back the workpieces in a direction opposite their displacement direction which, as usual, is transverse to the elongated workpieces. Thus any workpiece lying atop another is brushed back until it falls into place. The brush can travel along the workpieces to orient them as it travels.

In another system (U.S. Pat. No. 4,997,079) there is a roller provided above the transport surface which has wheel elements with grooves extending transverse to the transport direction. When driven against the movement direction of the workpieces these rollers again sort the workpieces into a generally parallel array. Conveyor belts (German 2,937, 496) can also be used.

All these devices are quite complex, often require careful readjustment as workpiece size changes, and occasionally let two crossed workpieces get through to the downstream end of the input conveyor, where they are supposed to lie one deep and extend generally parallel to one another.

OBJECTS OF THE INVENTION

It is therefore an object of the present invention to provide an improved system for orienting elongated workpieces parallel to one another.

Another object is the provision of such an improved system for orienting elongated workpieces parallel to one another which overcomes the above-given disadvantages, that is which is of simple construction, which does not need adjustment for workpiece size, and which never lets crossed workpieces past.

A further object is to provide an improved workpiece-aligning method.

SUMMARY OF THE INVENTION

A conveyor defining a horizontal transport surface receives elongated workpieces in crossed-over and nonparallel orientation at an input side of the surface and moves them in a horizontal transport direction to an output side of the surface. A workpiece-aligning apparatus has according to the invention a guide extending generally parallel to the workpieces along the surface, a carriage displaceable along the guide parallel to the workpieces, and a pushdown element vertically displaceable on the carriage between a lower position engaging and pushing down the workpieces and an upper position above the workpieces. A drive displaces the carriage along the guide with the element in the lower position and thereby presses the workpieces down against the transport surface and moves the workpieces into generally parallel alignment with one another.

Thus the apparatus, which can move in the workpiece transport direction as well as transverse to it, sweeps from one end of a group of workpieces on the surface to the other end. As the element presses the workpieces down it aligns then starting from the one end to the opposite end, leaving the workpieces behind it in its wake aligned generally parallel to each other. The apparatus according to the invention sweeps back and forth rapidly enough that the workpieces that move off the output side of the conveyor are arranged generally parallel to one another and never overlie or underlie adjacent workpieces.

The transport direction according to the invention is transverse to the workpiece and the guide and the carriage is at the output side of the surface. The carriage can also move somewhat transversely of the workpieces.

The element in accordance with the invention has a downwardly directed surface elongated transverse to the workpieces and engageable therewith. In fact the element is a generally cylindrical roller rotatable about a horizontal axes transverse to the workpieces. The roller in turn is carried on a lower end of an arm having an upper end pivoted on the carriage.

The roller-carrying arm has an upper-end extension formed with a cam follower and the guide has one end provided with a cam engageable with the follower to raise the roller into an upper position out of engagement with the workpieces on the surface. One such cam can be provided at each end for raising the roller. Normally the roller is swept in one direction only, but it can work bidirectionally.

A latch engageable between the carriage and the arm retains the roller in an upper position out of contact with the workpieces on the surface. Means is provided at one end of the guide for releasing the latch and letting the roller drop down on the workpieces. This release is combined with the above-described cam follower and cam so that the roller can be latched at the downstream end of its stroke, with single-direction aligning, returned to the upstream end latched in the up position, and then the latch is released and the roller is slowly lowered by the upstream-end cam as it moves off downstream.

The method according to the invention therefore basically comprises the steps of pressing an element down on the workpieces and displacing the element while it is pressed down on the workpieces longitudinally along the workpieces and thereby arraying them generally parallel to one another. The element is rotated and rolled over the workpieces as it is displaced longitudinally along the workpieces. In addition the element can be vertically vibrated while pushing it down on the workpieces for best aligning effect.

BRIEF DESCRIPTION OF THE DRAWING

The above and other objects, features, and advantages will become more readily apparent from the following description, reference being made to the accompanying drawing in which.

SPECIFIC DESCRIPTION

Figure 4:
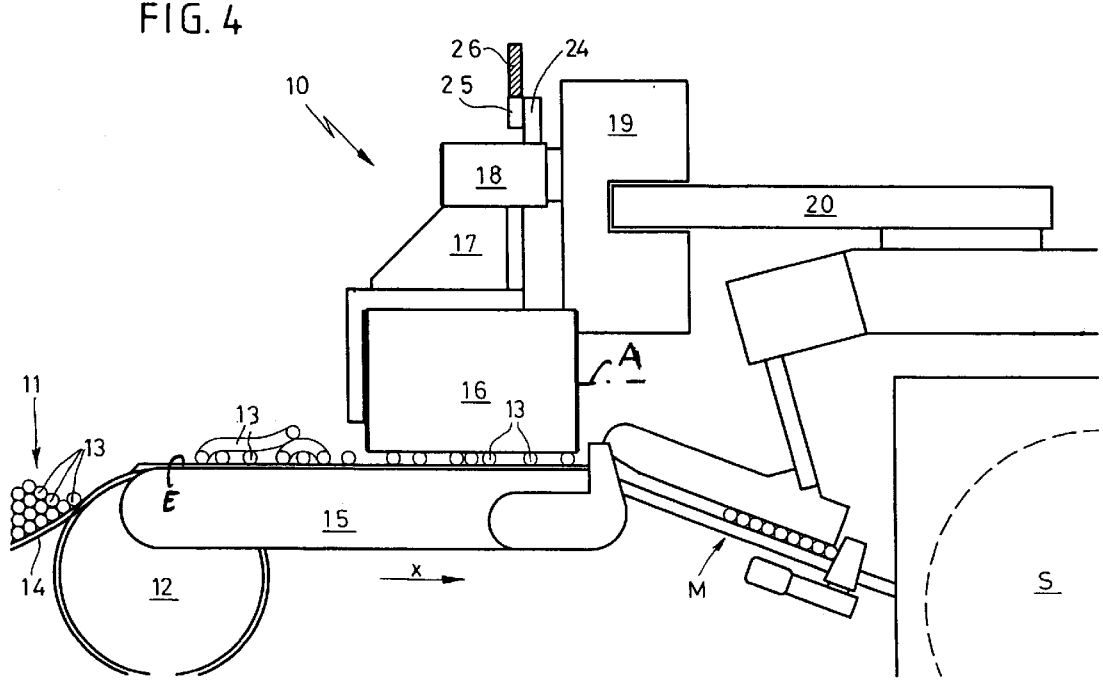
FIG. 4 is a small-scale end view of the apparatus of this invention.

As seen in FIG. 4 a stack 11 of jumbled elongated workpieces 13 are fed on a belt 14 to an input roller 12 whence they are picked up, with some workpieces 13 lying atop and over others, by a chain conveyor 15 that moves them in a direction x that is transverse to the longitudinally elongated workpieces 13 on a horizontal support surface E. A parallel-sorting apparatus 10 described in more detail below arrays the workpieces 13 so that they are generally parallel to one another and no one workpiece overlies or underlies another. The downstream end of the transverse conveyor 15 feeds the parallel workpieces to a feeder magazine M whence they are passed to a processing machine, here a cutter S.

Figure 1:
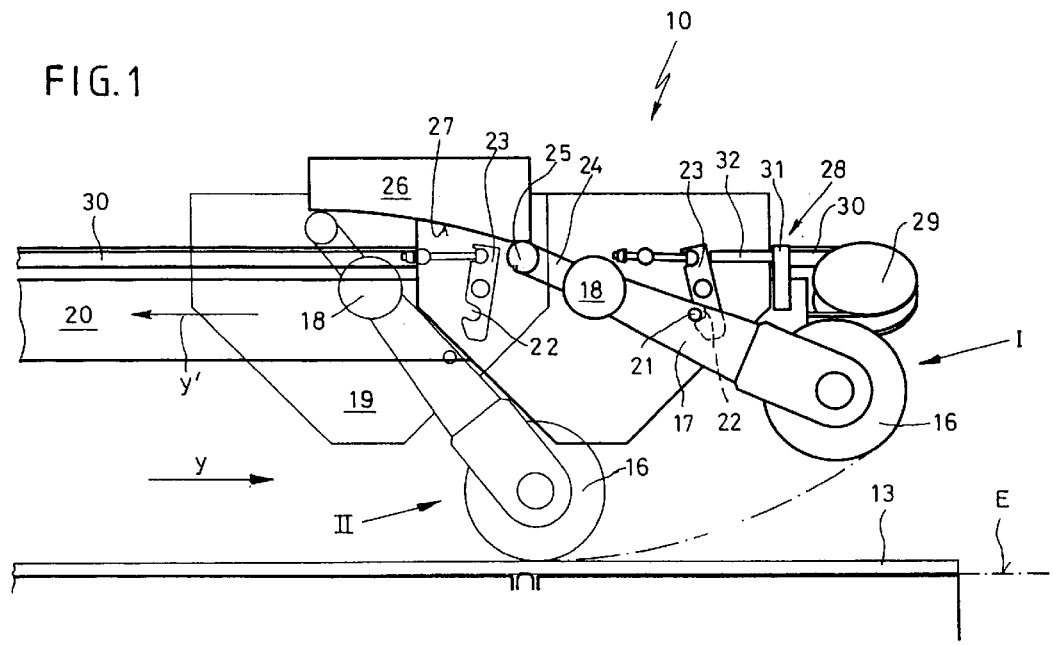
FIG. 1 is a side view of the apparatus according to the invention at the start of a work cycle.
Figure 2:
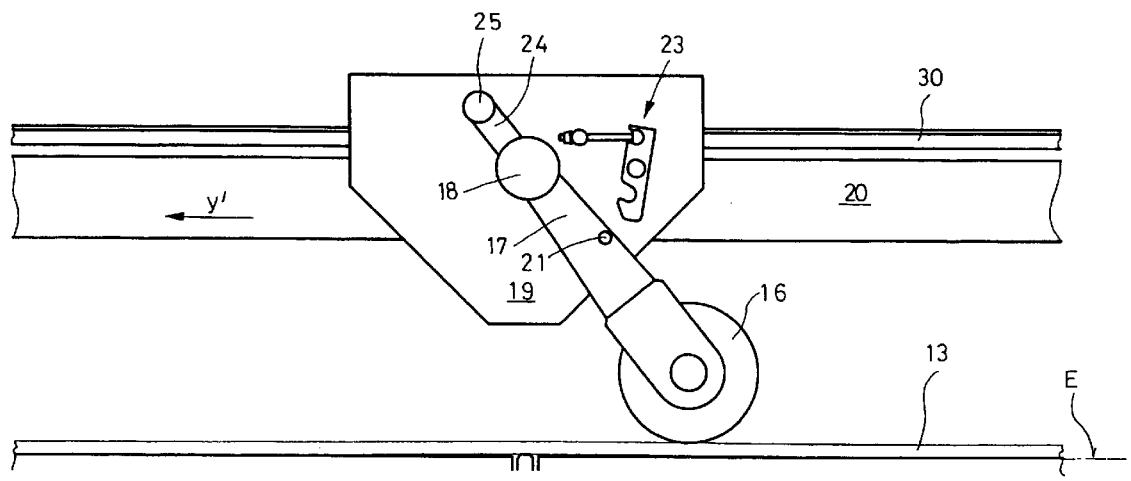
FIG. 2 is the apparatus in the middle of a work cycle.
Figure 3:
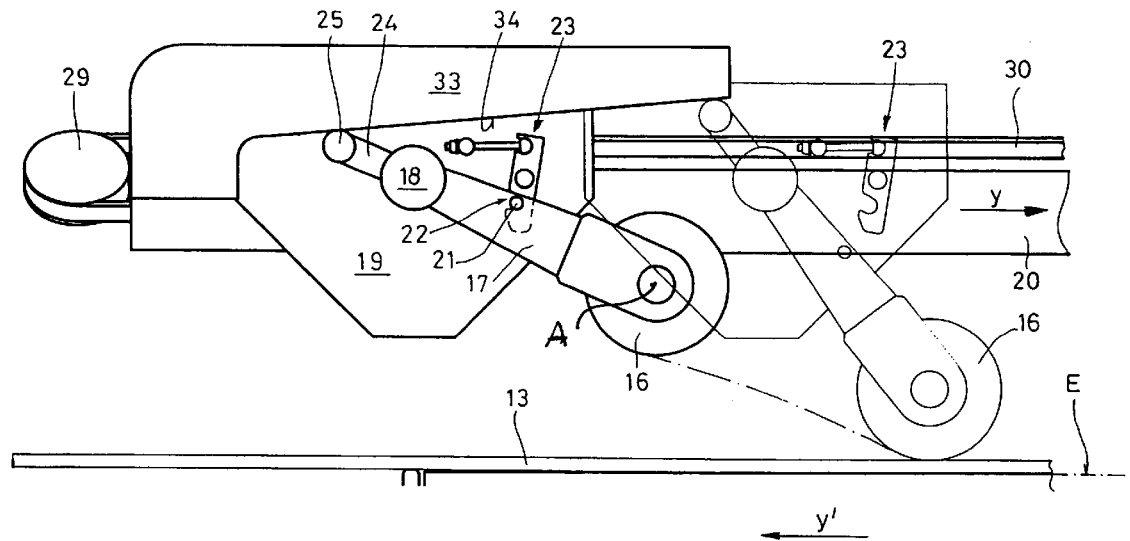
FIG. 3 is the apparatus at the end of the work cycle.

According to the invention as shown in FIGS. 1 to 3 the sorting apparatus 10 comprises a push-down element 16 here constituted as a large-diameter cylindrical roller pivotal about a horizontal axis A parallel to the direction x on the outer end of a pair of arms 17 pivoted at 18 on a carriage 19 that can travel in horizontal directions y and y' perpendicular to the direction x on a guide 20. A pin 21 projecting in the direction x from each of the arms 17 between the respective pivot 18 and roller 18 can be engaged in a mouth 22 of a respective dog 23 pivotal on the carriage 19 to hold the arms 17 and roller 16 in upper position I shown in solid lines in FIGS. 1 and 3. The arm 17 has an upper extension 24, in effect making it into a two-arm lever, which carries a roller 25 engageable with a cam surface 27 (FIG. 1) of a cam 26 fixed at one end of the guide 20. At the same end of the guide 20 a support 31 carries a pusher rod 32 engageable with the dog 23 to pivot it away from the pin 21. The opposite end of the guide 20 has a cam 33 (FIG. 3) formed with an inclined cam edge 34 that is engageable with the roller 25 to cam it downward and pick up the roller 15, like the cam edge 27. A drive 28 comprises pulleys 29 at opposite ends of the guide 20 and a belt or chain 30 extending between them and connected to the carriage 19 for reciprocating it in the directions y and y'.

Figure 5:
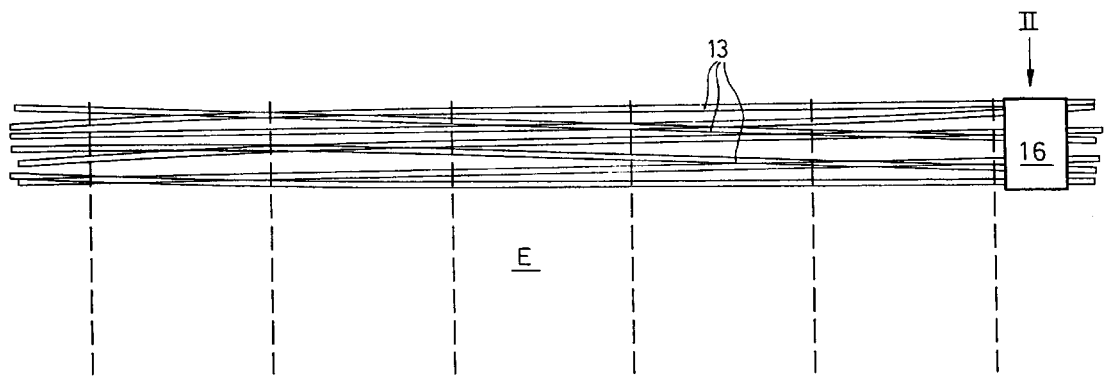
FIGS. 5, 6, and 7 are small-scale top views of the machine generally in the positions of respective FIGS. 1, 2, and 3.
Figure 6:
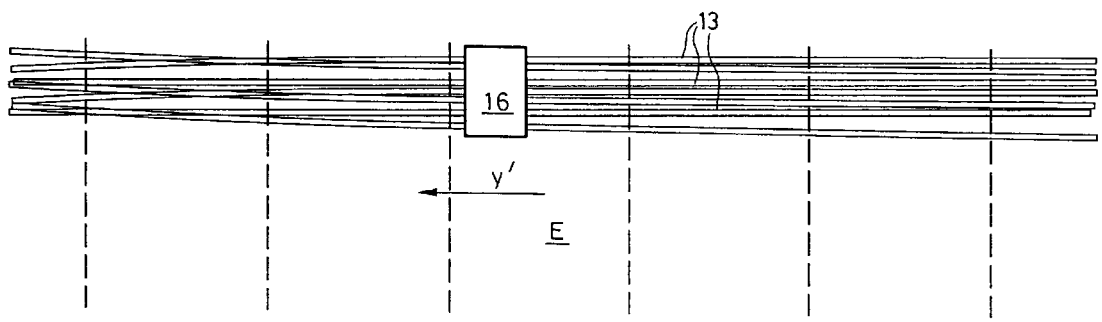
Figure 7:
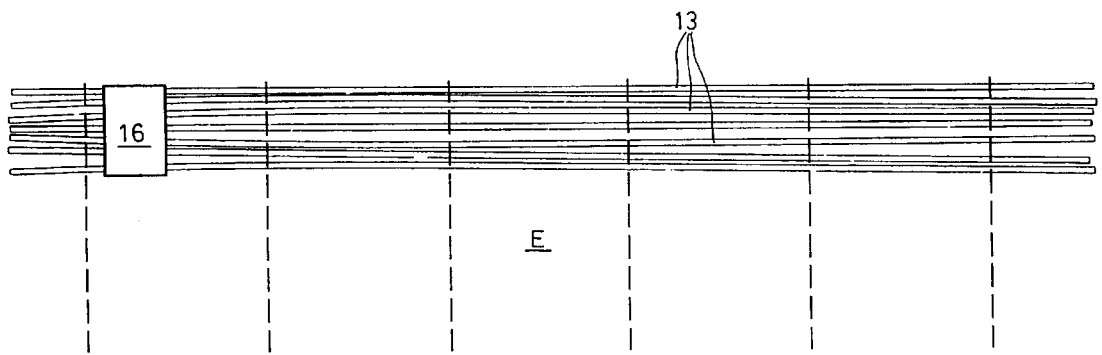

The system described above functions as follows:

To start with the roller 16 is in position II shown in light solid lines in FIG. 1 and in FIG. 5. The drive 28 is operated to pull the carriage 19 and roller 16 in the direction y' so that it travels along the workpieces 13, pressing down very strongly on any workpiece 13 that sticks up above the others and forcing the workpieces 13 into positions extending generally parallel to one another. The roller 16 can bear down merely with its own weight, or with extra force from a spring or fluid actuator so the downward force it applies can be adjusted according to workpiece type, i.e. more for solid-section workpieces and less for tubes. As it moves from the position of FIGS. 1 and 5 to the position of FIGS. 2 and 6 the workpieces 15 are left generally parallel to each other behind the moving carriage.

When the carriage 19 comes to the downstream end of its travel the roller 25 will engage the cam surface 34 (FIG. 3) which will cam up the push-down roller 16 and lift it up off the workpieces 13, while causing the pins 21 to catch in the mouths 22 of the pawls 23. This will lock the roller 16 in the raised position.

Thereupon the drive 28 is reversed to move the carriage 19 with the raised roller 16 back in the direction y until the rods 32 engage the pawls 23 in position I and unhook them from the pins 21 so that only the engagement of the cam-follower roller 25 with the cam edge 27 is holding the roller 16 up. When the travel direction of the carriage 19 is again reversed, the roller 25 will ride up on the cam edge 27 to set the roller 16 gently back down on the workpieces 13 so that another aligning operation can take place. The cam 26 therefore prevents the roller 16 from dropping abruptly onto the workpieces 13 and damaging them.

Thus with each sweep of the roller 16, which can according to the invention rest on the workpieces 13 during travel in both directions, the group of workpieces 13 at the downstream region or output side of the conveyor 15 are arrayed generally parallel to one another, the aligning effect being augmented if the roller is vibrated somewhat. Since the roller works along the workpieces, it will smoothly and in fact gently rearrange them. There will be no damage to the workpieces 13 and the system can easily cycle fast enough to keep up with the normally steady advance of the workpieces 13 in the transport direction x. The roller 16 can move through a considerable vertical stroke so that it can be used to align large and small workpieces without adjustment, it merely being important that the smallest-diameter workpiece be at least half as big as the largest-diameter workpiece.

We claim:

1. In combination with a conveyor defining a horizontal transport surface and receiving elongated workpieces in crossed-over and nonparallel orientation at an input side of the surface and moving them in a horizontal transport direction to an output side of the surface, an apparatus comprising:

a guide extending generally parallel to the workpieces along the surface;

a carriage displaceable along the guide parallel to the workpieces;

a pushdown element vertically displaceable on the carriage between a lower position engaging and pushing down the workpieces and an upper position above the workpieces; and drive means for displacing the carriage along the guide with the element in the lower position and thereby pressing the workpieces down against the transport surface and moving the workpieces into generally parallel alignment with one another.

2. The workpiece-aligning apparatus defined in claim 1 wherein the transport direction is transverse to the workpiece and the guide and carriage are at the output side of the surface.

3. The workpiece-aligning apparatus defined in claim 1 wherein the element has a downwardly directed surface elongated transverse to the workpieces and engageable therewith.

4. The workpiece-aligning apparatus defined in claim 3 wherein the element is a generally cylindrical roller rotatable about a horizontal axes transverse to the workpieces.

5. The workpiece-aligning apparatus defined in claim 4, further comprising an arm having an upper end pivoted on the carriage and a lower end on which the roller is rotatable.

6. The workpiece-aligning apparatus defined in claim 5 wherein the arm has an upper-end extension formed with a cam follower and the guide has one end provided with a cam engageable with the follower to raise the roller into an upper position out of engagement with the workpieces on the surface.

7. The workpiece-aligning apparatus defined in claim 6 wherein the guide has an opposite end provided with another such cam.

8. The workpiece-aligning apparatus defined in claim 5, further comprising latch means engageable between the carriage and the arm for retaining the roller in an upper position out of contact with the workpieces on the surface.

9. The workpiece-aligning apparatus defined in claim 8, further comprising means at one end of the guide for releasing the latch and letting the roller drop down on the workpieces.

10. The workpiece-aligning apparatus defined in claim 9 wherein the arm has an upper-end extension formed with a cam follower and the one end of the guide is provided with a cam engageable with the follower to raise the roller into an upper position out of engagement with the workpieces on the surface.

11. A method of aligning workpieces on a conveyor defining a horizontal transport surface and receiving elongated workpieces in crossed-over and nonparallel orientation at an input side of the surface and moving them in a horizontal transport direction to an output side of the surface, the method comprising the steps of:

pressing an element down on the workpieces; and displacing the element while it is pressed down on the workpieces longitudinally along the workpieces and thereby arraying them generally parallel to one another.

12. The workpiece-aligning method defined in claim 11 wherein the element is a roller that is rotated and rolled over the workpieces as it is displaced longitudinally along the workpieces.

13. The workpiece-aligning method defined in claim 11, further comprising the step of:

vertically vibrating the element while pushing it down on the workpieces.

\* \* \* \* \*